May 29, 1934.  R. GASPARIK  1,960,701
ELECTRICAL CIRCUIT
Filed April 18, 1932
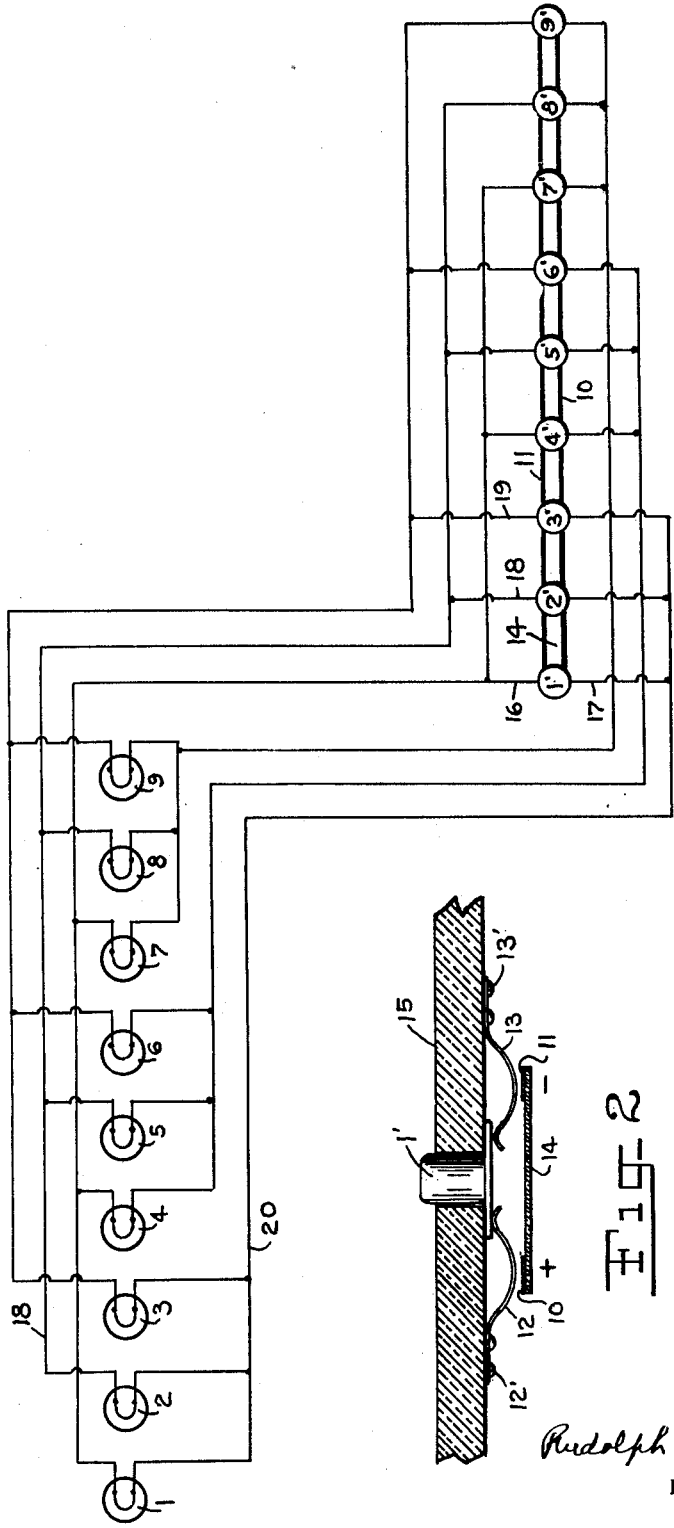

Patented May 29, 1934

1,960,701

UNITED STATES PATENT OFFICE 1,960,701

ELECTRICAL CIRCUIT

Rudolph Gasparik, New York, N. Y., assignor of ten per cent to Morton Lane, New York, N. Y.

Application April 18, 1932, Serial No. 606,059

3 Claims. (Cl. 171—97)

My invention relates to improvements in methods of wiring electrical circuits, and more particularly has reference to, and is illustrated in the accompanying drawing in its applicaton to a lighting circuit and power line whereby the amount of wire required for the separate control of the individual lights or other electrical appliances is much less than is required by the usual well known systems of wiring.

Referring to said drawing, Fig. 1 illustrates diagrammatically a suitable wiring system for nine lights or other electrical appliances controllable separately by nine buttons or switches, and Fig. 2 is an enlarged detail partly in section illustrating the button or switch mechanism and power light connection.

1 to 9 inclusive indicate the lamps or electrical devices to be energized, and 1' to 9' inclusive indicate the buttons or switches for allowing the current to pass therethrough. 10 indicates one side of the power line, and 11 the other side, and 1' indicates in Fig. 2 a suitable form of button adapted when depressed to move the springs 12, 13 downwardly so as to contact with the bus bars 10, 11 of the power line which may if desired, be secured upon a suitable insulating base such as 14. Each side of a lamp is connected to one of the springs 12, 13 beneath one of the screws such as 12', 13', 15 indicating a suitable insulated panel through which the button 1' projects. When the button 1' is depressed, current from the bus 11 passes through the spring 13 connected with the line 16, passing upwardly and leftwardly to the lamp 1 and returning by way of the line 17 to the spring 12 and bus bar 10. When the button 2' is depressed, the current passes from the bus bar 11 through line 18, lamp 2 and returns by the line 17 to bus bar 10. When button 3' is depressed, the current from bus bar 11 passes by way of 19 to lamp 3 returning by line 20 to bus bar 10, and so on as indicated in the diagram, whereas according to the usual practice, one side of the lamps would be supplied by a line directly from the bus bar, while separate lines would pass from each lamp to each button, and from the other side of each button to the other bus bar, thus involving considerable needless length of wire, and the expense and labor incident thereto.

Of course it will be understood that various modifications may be made in the construction and arrangement of switch or button to be employed, and that the system is susceptible of application wherever electrical devices are to be individually controlled or controlled in groups from a predetermined point of control.

I claim:

1. In an electrical system of wiring of the class described, a source of current supply, electrically operative means and control means therefor electrically connected in said system, each one of said control means operatively connected in circuit with a different one of said operative means, and connecting conductors between said operative means and said control means equal in number to twice the root of the number of said operative means.

2. In an electrical system of wiring of the class described, a source of current supply, electrically operative means and control means therefor electrically connected in said system, each of said control means adapted to connect a different operative means to said source of supply, and electrical connections between said means aggregating two-thirds the number of either of said means.

3. In an electrical system of wiring of the class described, a source of current supply, electrically operative means and control means therefor electrically connected in said system, each of said control means adapted to connect a different operative means to said source of supply, and electrical connections between said means aggregating two-thirds the number of either of said means, said control means being adapted to be connected to both sides of said source of current supply.

RUDOLPH GASPARIK.